United States Patent
Shih et al.

(10) Patent No.: US 9,703,422 B2
(45) Date of Patent: *Jul. 11, 2017

(54) SENSOR-BASED ESD DETECTION

(71) Applicant: Apple Inc., Cupertino, CA (US)

(72) Inventors: David H. C. Shih, Santa Clara, CA (US); Albert Lin, Cupertino, CA (US); Jacob L. Matlick, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,678

(22) Filed: Sep. 9, 2016

(65) Prior Publication Data

US 2016/0378264 A1 Dec. 29, 2016

Related U.S. Application Data

(62) Division of application No. 13/750,847, filed on Jan. 25, 2013, now Pat. No. 9,442,597.

(60) Provisional application No. 61/716,404, filed on Oct. 19, 2012.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04108* (2013.01)

(58) Field of Classification Search
None
See application file for complete search history.

(56) References Cited

U.S. PATENT DOCUMENTS

| | | |
|---|---|---|
| 3,558,917 A | 1/1971 | Crouse |
| 4,163,909 A | 8/1979 | Harr |
| 5,223,784 A | 6/1993 | Nelson et al. |
| 5,287,074 A | 2/1994 | Meguro et al. |

(Continued)

FOREIGN PATENT DOCUMENTS

| | | |
|---|---|---|
| EP | 1 901 157 A2 | 3/2008 |
| EP | 2 104 023 A2 | 9/2009 |

(Continued)

OTHER PUBLICATIONS

Anonymous. (2008). "SLIMbus™ Host Controller IP," Arasan Chip Systems, Inc. Version 1.4, URL http://www.arasan.com/products/prod_overview/mipi/SLIMbus_Host_pb.pdf, last visited on Oct. 2, 2008, two pages.

(Continued)

*Primary Examiner* — Kent Chang
*Assistant Examiner* — Benjamin Morales Fernande
(74) *Attorney, Agent, or Firm* — Morrison & Foerster LLP

(57) ABSTRACT

A touch sensitive device that detects the occurrence of an electrostatic discharge event on the device by analyzing one or more ESD sensors located in various locations on the touch sensitive device is provided. A touch controller can scan touch nodes on the touch sensitive device while simultaneously scanning one or more ESD sensors to detect if a possible ESD event has occurred during the acquisition of a touch image. If an ESD event has occurred during the acquisition of touch data, the touch controller can act to either ignore the data, or compensate the data to account for effects on the touch data caused by the ESD event.

27 Claims, 10 Drawing Sheets

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,491,706 A | 2/1996 | Tagawa et al. | |
| 5,610,629 A | 3/1997 | Baur | |
| 5,784,036 A | 7/1998 | Higuchi et al. | |
| 5,796,256 A | 8/1998 | Fowler et al. | |
| 5,825,352 A | 10/1998 | Bisset et al. | |
| 5,835,079 A | 11/1998 | Shieh | |
| 5,880,411 A | 3/1999 | Gillespie et al. | |
| 5,896,120 A | 4/1999 | Iguchi et al. | |
| 6,057,910 A | 5/2000 | Dunne | |
| 6,081,259 A | 6/2000 | Teterwalk | |
| 6,188,391 B1 | 2/2001 | Seely et al. | |
| 6,236,386 B1 | 5/2001 | Watanabe | |
| 6,310,610 B1 | 10/2001 | Beaton et al. | |
| 6,323,846 B1 | 11/2001 | Westerman et al. | |
| 6,411,250 B1 | 6/2002 | Oswald et al. | |
| 6,424,338 B1 | 7/2002 | Anderson | |
| 6,476,798 B1 | 11/2002 | Bertram et al. | |
| 6,549,193 B1 | 4/2003 | Huang et al. | |
| 6,587,800 B1 | 7/2003 | Parker et al. | |
| 6,657,616 B2 | 12/2003 | Sims | |
| 6,690,387 B2 | 2/2004 | Zimmerman et al. | |
| 6,765,557 B1 | 7/2004 | Segal et al. | |
| 7,015,894 B2 | 3/2006 | Morohoshi | |
| 7,024,337 B2 | 4/2006 | Yoda | |
| 7,072,804 B2 | 7/2006 | Weller | |
| 7,170,501 B2 | 1/2007 | Inamori | |
| 7,184,064 B2 | 2/2007 | Zimmerman et al. | |
| 7,367,004 B2 | 4/2008 | Katou | |
| 7,428,708 B2 | 9/2008 | Okamoto et al. | |
| 7,511,702 B2 | 3/2009 | Hotelling | |
| 7,538,760 B2 | 5/2009 | Hotelling et al. | |
| 7,650,555 B2 | 1/2010 | Imming et al. | |
| 7,656,168 B2 | 2/2010 | Mahowald et al. | |
| 7,663,607 B2 | 2/2010 | Hotelling et al. | |
| 8,040,142 B1 | 10/2011 | Bokma et al. | |
| 8,294,687 B1 | 10/2012 | Ksondzyk | |
| 8,479,122 B2 | 7/2013 | Hotelling et al. | |
| 8,874,396 B1 | 10/2014 | Olson et al. | |
| 2002/0089491 A1 | 7/2002 | Willig | |
| 2002/0135568 A1 | 9/2002 | Chen | |
| 2003/0058929 A1 | 3/2003 | Cox et al. | |
| 2003/0197689 A1 | 10/2003 | May | |
| 2003/0206162 A1 | 11/2003 | Roberts | |
| 2004/0090730 A1 | 5/2004 | Byrne et al. | |
| 2004/0100450 A1 | 5/2004 | Choi | |
| 2006/0197753 A1 | 9/2006 | Hotelling | |
| 2006/0256093 A1 | 11/2006 | Furukawa et al. | |
| 2007/0046639 A1 | 3/2007 | Swedin | |
| 2008/0030239 A1 | 2/2008 | Sullivan et al. | |
| 2008/0165157 A1 | 7/2008 | Fu | |
| 2008/0179112 A1 | 7/2008 | Qin et al. | |
| 2008/0218129 A1 | 9/2008 | Yun | |
| 2008/0310485 A1 | 12/2008 | Soliman et al. | |
| 2009/0085894 A1 | 4/2009 | Gandhi et al. | |
| 2009/0202002 A1 | 8/2009 | Yao et al. | |
| 2009/0204860 A1 | 8/2009 | Yao et al. | |
| 2010/0026656 A1 | 2/2010 | Hotelling et al. | |
| 2010/0201314 A1 | 8/2010 | Toncich et al. | |
| 2010/0253641 A1 | 10/2010 | Swedin | |
| 2011/0069031 A1 | 3/2011 | Fu | |
| 2011/0133700 A1 | 6/2011 | Martin et al. | |
| 2011/0157068 A1 | 6/2011 | Parker et al. | |
| 2011/0157069 A1 | 6/2011 | Zhuang et al. | |
| 2011/0249394 A1 | 10/2011 | Nielsen et al. | |
| 2011/0254802 A1 | 10/2011 | Philipp | |
| 2011/0266074 A1 | 11/2011 | Fan et al. | |
| 2012/0043976 A1 | 2/2012 | Bokma et al. | |
| 2012/0062479 A1 | 3/2012 | Feldstein et al. | |
| 2012/0071149 A1 | 3/2012 | Bandyopadhyay et al. | |
| 2012/0287081 A1 | 11/2012 | Akai et al. | |
| 2012/0293445 A1 | 11/2012 | Crandall et al. | |
| 2012/0306739 A1 | 12/2012 | Tsuda | |
| 2013/0044076 A1 | 2/2013 | Wang et al. | |
| 2013/0076700 A1 | 3/2013 | Chiu | |
| 2013/0113711 A1 | 5/2013 | Nien et al. | |
| 2013/0141346 A1 | 6/2013 | Oh | |
| 2013/0319137 A1 | 12/2013 | Grau et al. | |
| 2014/0028624 A1 | 1/2014 | Marsden et al. | |
| 2014/0092061 A1 | 4/2014 | Akai et al. | |
| 2014/0111467 A1 | 4/2014 | Chen et al. | |
| 2014/0132559 A1 | 5/2014 | Kim | |
| 2014/0168539 A1 | 6/2014 | Kim et al. | |
| 2014/0267059 A1 | 9/2014 | Deokar et al. | |
| 2015/0091865 A1 | 4/2015 | Funayama | |
| 2015/0169108 A1 | 6/2015 | Ishii et al. | |
| 2015/0193070 A1 | 7/2015 | Tilak et al. | |
| 2015/0234519 A1 | 8/2015 | Gowreesunker et al. | |
| 2015/0242015 A1 | 8/2015 | Cho et al. | |
| 2015/0355767 A1 | 12/2015 | Abe et al. | |
| 2015/0370410 A1 | 12/2015 | Sauer | |

FOREIGN PATENT DOCUMENTS

| | | | |
|---|---|---|---|
| GB | 2424993 A | 10/2006 | |
| JP | 2000-076002 A | 3/2000 | |
| JP | 2000-163031 A | 6/2000 | |
| JP | 2002-342033 A | 11/2002 | |
| WO | WO-2005/036510 A1 | 4/2005 | |
| WO | WO-2008/085786 A2 | 7/2008 | |
| WO | WO-2008/085786 A3 | 7/2008 | |

OTHER PUBLICATIONS

Boyce, K. (2008). "An Introduction to the Mobile Industry Processor Interface (MIPI) Alliance Standard; Serial Low-Power Inter-Chip Media Bus (SLIMbus™)," *National Semiconductor Audio Products Group*, URL https://www.national.com/appinfo/audio/files/intro_to_SLIMbus.pdf, last visited Oct. 2, 2008, 20 pages.

Final Office Action mailed May 19, 2011, for U.S. Appl. No. 12/229,685, filed Aug. 25, 2008, 16 pages.

Final Office Action mailed Jul. 6, 2012, for U.S. Appl. No. 12/954,557, 21 pages.

Final Office Action mailed Nov. 26, 2012, for U.S. Appl. No. 12/954,557, filed Nov. 24, 2010, 16 pages.

Final Office Action mailed May 22, 2013, for U.S. Appl. No. 12/240,692, filed Sep. 29, 2008, 10 pages.

Final Office Action mailed Nov. 29, 2013, for U.S. Appl. No. 12/954,557, filed Nov. 24, 2010, 17 pages.

Final Office Action mailed Jun. 27, 2014, for U.S. Appl. No. 12/240,692, filed Sep. 29, 2008, 11 pages.

Final Office Action mailed Sep. 16, 2015, for U.S. Appl. No. 12/240,692, filed Sep. 29, 2008, 13 pages.

Final Office Action mailed Dec. 4, 2015, for U.S. Appl. No. 13/750,847, filed Jan. 25, 2013, 18 pages.

International Search Report mailed Dec. 23, 2008, for PCT Application No. PCT/US2007/089165, filed Dec. 28, 2007, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Mar. 19, 2010, for U.S. Appl. No. 11/620,466, 10 pages.

Non-Final Office Action mailed Dec. 7, 2010, for U.S. Appl. No. 12/229,685, filed Aug. 25, 2008, 17 pages.

Non-Final Office Action mailed Oct. 19, 2011, for U.S. Appl. No. 12/954,557, 21 pages.

Non-Final Office Action mailed Mar. 29, 2013, for U.S. Appl. No. 12/954,557, filed Nov. 24, 2010, 16 pages.

Non-Final Office Action mailed Feb. 17, 2012, for U.S. Appl. No. 12/229,685, filed Aug. 25, 2008, 18 pages.

Non-Final Office Action mailed Dec. 4, 2012, for U.S. Appl. No. 12/240,692, filed Sep. 29, 2008, 10 pages.

Non-Final Office Action mailed Feb. 13, 2014, for U.S. Appl. No. 12/240,692, filed Sep. 29, 2008, 10 pages.

Non-Final Office Action mailed Feb. 27, 2015, for U.S. Appl. No. 12/240,692, filed Sep. 29, 2008, 12 pages.

Non-Final Office Action mailed Apr. 8, 2015, for U.S. Appl. No. 13/750,847, filed Jan. 25, 2013, 15 pages.

(56) References Cited

OTHER PUBLICATIONS

Notice of Allowance mailed Aug. 11, 2010, for U.S. Appl. No. 11/620,466, four pages.
Notice of Allowance mailed May 19, 2016, for U.S. Appl. No. 13/750,847, filed Jan. 25, 2013, 8 pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Oct. 27, 2015, for U.S. Appl. No. 14/312,437, filed Jun. 23, 2014, 24 pages.
Non-Final Office Action mailed Jul. 1, 2016, for U.S. Appl. No. 14/312,437, filed Jun. 23, 2014, 27 pages.
Non-Final Office Action mailed Dec. 30, 2016, for U.S. Appl. No. 14/312,437, filed Jun. 23, 2014, 26 pages.

SENSOR-BASED ESD DETECTION

CROSS-REFERENCE TO RELATED APPLICATIONS

This application is a continuation of U.S. patent application Ser. No. 13/750,847 (now U.S. Publication No. 2014/0111465), filed Jan. 25, 2013, which claims benefit of U.S. Provisional Patent Application No. 61/716,404, filed Oct. 19, 2012, the entire disclosures of which are incorporated herein by reference for all purposes.

FIELD OF THE DISCLOSURE

This relates generally to the use of specialized sensors placed in various locations on a touch input device to detect the presence of an electrostatic discharge (ESD) event occurring on the device.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can generate touch images and then interpret the touch images in accordance with the display appearing at the time of the touch event, and thereafter can perform one or more actions based on the touch image.

Electronic devices in general can be susceptible to electrostatic discharge (ESD) events, which in general are caused by objects external to the device imparting electrostatic energy onto the device. In the instance of touch input devices, ESD events can generate a "false touch" on the touch screen; in other words, the device will determine that a touch or proximity event has occurred when none exists. Furthermore, ESD events can also cause a device to ignore an actual touch or proximity event. For example, mutual capacitance touch sensor panels can be formed from a matrix of drive and sense lines of a substantially transparent conductive material such as Indium Tin Oxide (no). The lines are often arranged orthogonally on a substantially transparent substrate. An ESD event can be coupled into the matrix of drive lines and sense lines, causing signals to appear that can be misinterpreted as a touch or proximity event. Also, ESD events can be coupled into the matrix of drive and sense lines causing signals to appear as negative touches, such that when a real touch occurs, it is not detected. The false touches or undetected touches can lead to an overall degradation of the user experience in that the device will register touches that the user did not intend and furthermore may fail to recognize actual touches intended by a user of the device.

SUMMARY OF THE DISCLOSURE

This relates to a touch input device that can be configured with dedicated ESD sensors placed on the touch input device to detect the presence of an ESD event occurring on or in proximity to the device.

The sensors can be connected to a processor on the touch sensor device so that the device can be aware of the occurrence of an ESD event, and can compensate or ignore touch data that occurs while an ESD event is taking place on the device.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to the use of ESD sensors on a touch input device to detect the presence of an ESD event and alert the device so that any touch measurements taken during the ESD event can be ignored or compensated for by the device. Upon an indication of an ESD event occurring from the sensors, the device can either ignore touch data received during the ESD event, or can compensate the touch data to account for the ESD event based on the information gathered from the ESD sensor(s).

Although examples disclosed herein may be described and illustrated herein in terms of mutual capacitance touch sensor panels, it should be understood that the examples are not so limited, but are additionally applicable to self-capacitance sensor panels, and both single and multi-touch sensor panels in which ESD events can occur.

Figure 1:
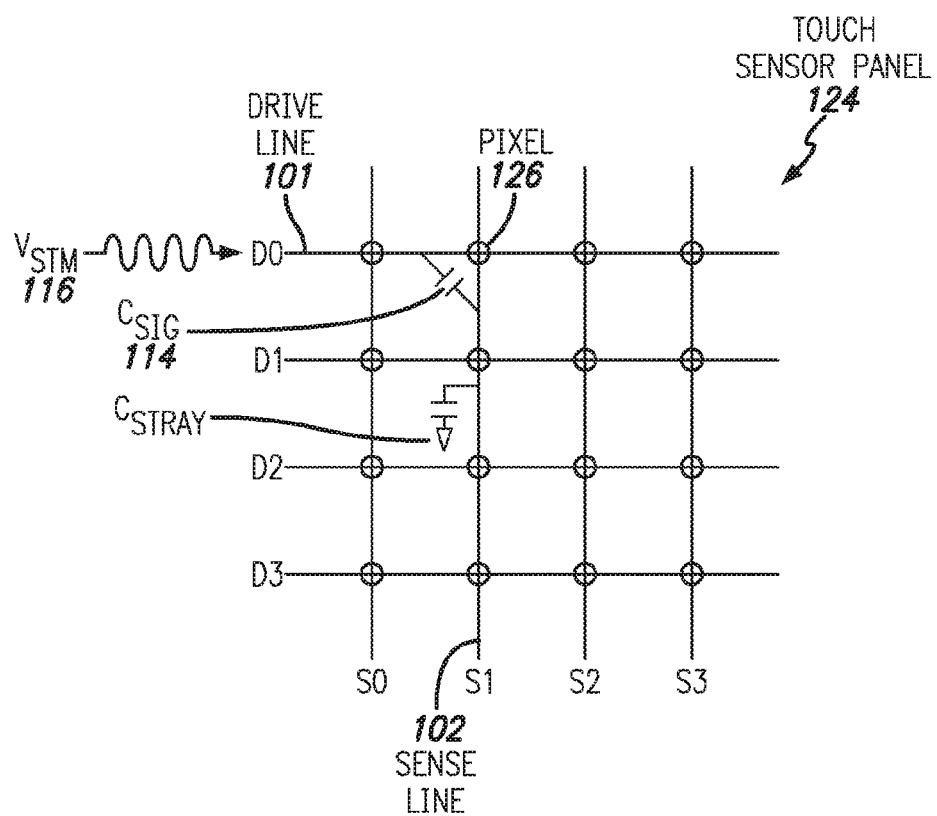
FIG. 1 illustrates an exemplary touch sensor panel in a no-touch condition according to disclosed examples.

FIG. 1 illustrates an exemplary touch sensor panel in a no-touch condition, i.e., when there are presently no touches at the panel, according to various examples. In the example of FIG. 1, touch sensor panel 124 can include an array of nodes 126 that can be formed at the crossings of rows of drive lines 101 (D0-D3) and columns of sense lines 102 (S0-S3). Each node 126 can have an associated mutual capacitance Csig 114 when the drive line 101 forming the node is stimulated with a stimulation signal Vstm 116. Each node 126 can also have an associated stray capacitance Cstray when the drive line 101 forming the node is not stimulated with a stimulation signal Vstm 116 but is connected to DC. In this example, drive line D0 can be stimulated with stimulation signal 116 (Vstm), forming mutual capacitance Csig 114 at the nodes 126 formed between the drive line D0 and the crossing sense lines S0-S3. One or more drive lines 101 can be stimulated at a time.

Figure 2:
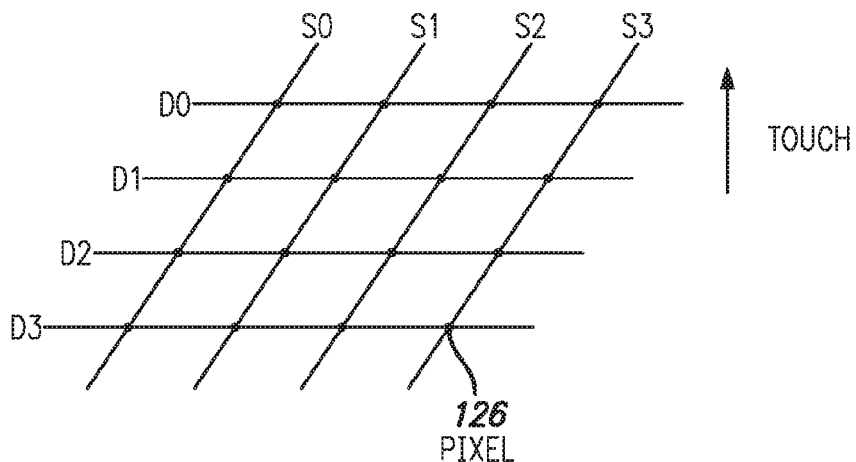
FIG. 2 illustrates an exemplary touch image map in a no-touch condition according to disclosed examples.

FIG. 2 illustrates an exemplary touch map of a touch sensor panel in a no-touch condition according to various examples, wherein touches detected in increasing amounts would symbolically register in the z-direction as shown by the arrow indicating increasing touch data values. In the example of FIG. 2, drive lines D0-D3 of a touch sensor panel can be individually and/or simultaneously stimulated with stimulation signal(s) Vstm. Since there are no fingers (or other objects) touching the nodes 126 formed by the drive lines D0-D3 and the crossing sense lines S0-S3, there is nothing to block some of the electric field lines formed when the drive lines are stimulated so as to reduce the mutual capacitance Csig by an amount ΔCsig. As such, the touch map can remain substantially flat at the nodes 126 to indicate no touch.

Referring again to FIG. 1, when a grounded user's finger (or other object) touches the panel 124, the finger can cause the capacitance Csig 114 to reduce by an amount ΔCsig at the touch location as previously mentioned. This capacitance change ΔCsig can be caused by current or charge from the electric field lines being shunted through the touching finger or object to ground. Touch signals representative of the capacitance change ΔCsig can be transmitted by the sense lines 102 to the sense circuitry for processing. The touch signals can indicate the node 126 where the touch occurred and the amount of touch that occurred at that node location.

Figure 3:
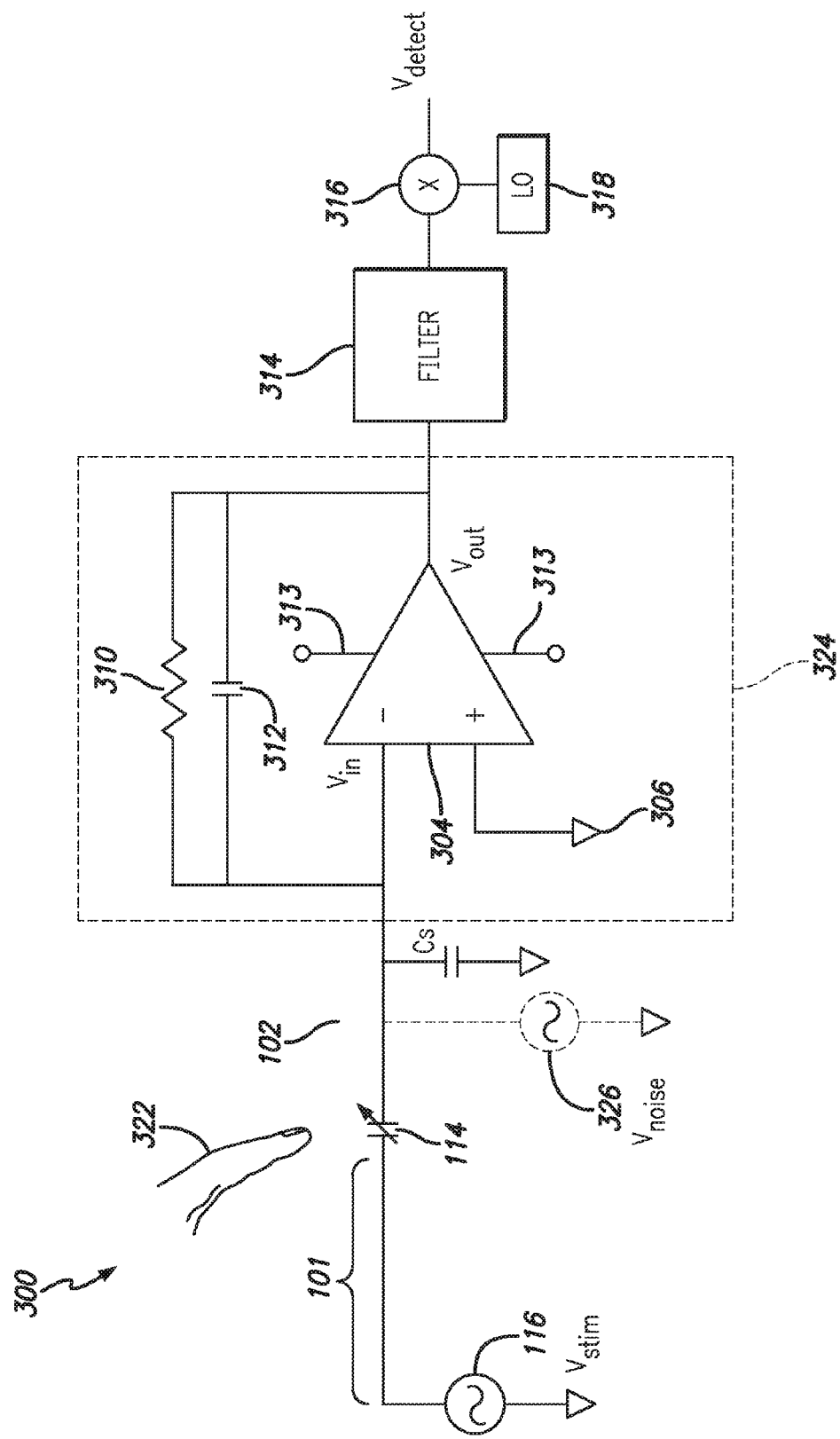
FIG. 3 illustrates an exemplary sensing circuit of a touch sensor panel according to disclosed examples.

FIG. 3 illustrates an exemplary sensing circuit of a touch sensor panel according to disclosed examples. Drive line 101 can be stimulated by stimulation signal 116. Stimulation signal 116 can be capacitively coupled to sense line 102 through the mutual capacitance 114 between drive line 101 and the sense line. When a finger or object 322 approaches the touch node created by the intersection of drive line 101 and sense line 102, the mutual capacitance 114 can be altered. This change in mutual capacitance 114 can be detected to indicate a touch or proximity event. The sense signal coupled onto sense line 102 can then be received by sense amplifier 324. Sense amplifier 324 can include operational amplifier 304, and at least one of a feedback resistor 310 and a feedback capacitor 312. FIG. 3 is shown for the general case in which both resistive and capacitive feedback elements are utilized. The sense signal can be inputted into the inverting input (referred to as Vin) of the operational amplifier 304, and the non-inverting input can be tied to a reference voltage Vref 306. The operational amplifier 304 can adjust its output voltage to keep Vin approximately equivalent to Vref and therefore keep Vin constant or virtually grounded as to reject stray capacitance Cs or any change thereof. Therefore, the gain of the amplifier can be mostly a function of the ratio of the signal capacitance 114 and the feedback impedance, comprised of resistors 310 and capacitor 312. The output of sense amplifier 304 Vout can be further filtered and heterodyned or homodyned by being fed into a multiplier 316, and multiplied with a local oscillator 318 to produce Vdetect. One skilled in the art will recognize that the placement of filter 314 can be varied, and thus could be placed after multiplier 316, or two filters can be employed, one before the mixer and one after the mixer. In some examples, there can be no filter at all. The direct current (DC) portion of Vdetect can be used to detect if a touch or proximity event has occurred.

An ESD event occurring on the touch sensor panel and being coupled into the sense signal pathway can be modeled by noise source 326 (Vnoise). During an ESD event, Vnoise 326 can inject a signal onto the sense line 102. This injection can compromise the sense circuit's 300 ability to reliably detect the change in mutual capacitance 114. An ESD event can inject a signal that is both positive in amplitude as well as negative and thus can cause the sense circuit 300 to register either a touch event when no touch event exists, or can cause no touch to be registered when a touch does exist. Furthermore, while not illustrated, an ESD event can also be coupled into the signal pathway via the drive line side of the sense circuit.

Figure 4A:
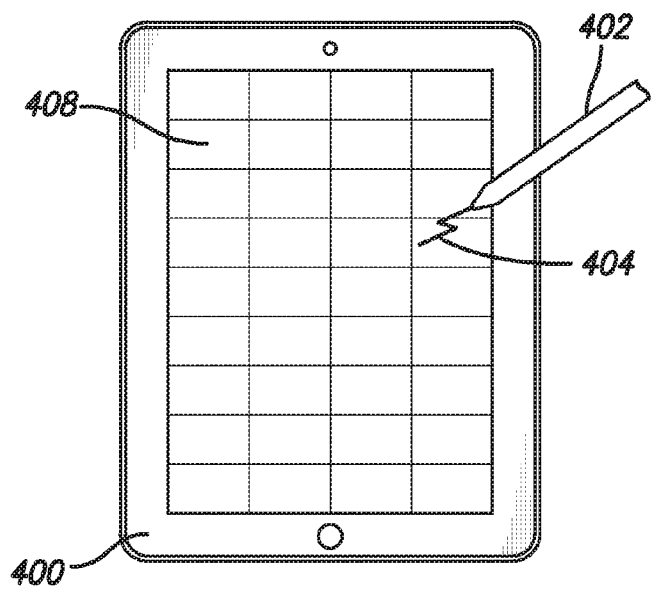
FIG. 4a illustrates an exemplary device incorporating a touch sensor panel with an ESD event occurring on the touch sensor panel according to disclosed examples.

FIG. 4a illustrates an exemplary device incorporating a touch sensor panel with an ESD event occurring on the touch sensor panel according to disclosed examples. As illustrated, a device 400 that contains a touch sensor panel 408 can have an ESD pulse 404 imparted directly on the touch sensor by an object 402. The ESD pulse 404 can be coupled onto the sense circuitry of the touch sensor panel as described above.

Figure 4B:
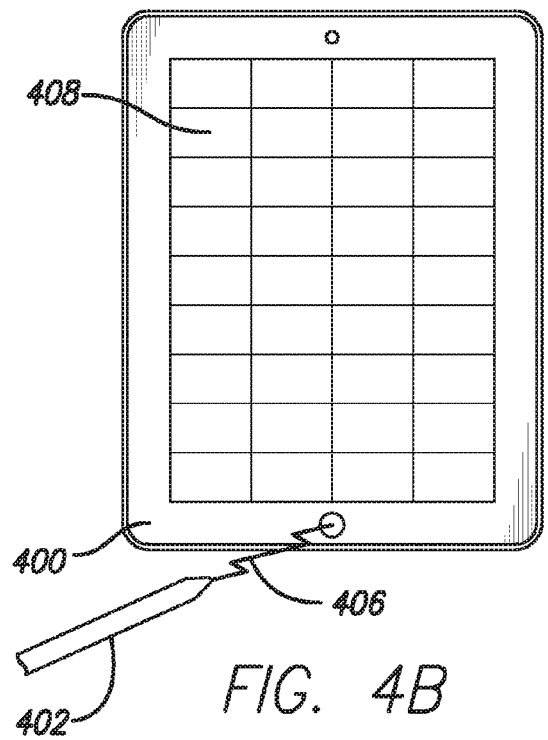
FIG. 4b illustrates an exemplary device incorporating a touch sensor panel with an ESD event occurring proximal to the touch sensor panel according to disclosed examples.

FIG. 4b illustrates an exemplary device incorporating a touch sensor panel with an ESD event occurring proximal to the touch sensor panel according to disclosed examples. As illustrated, device 400 containing touch sensor panel 408 can have an ESD pulse 406 that is imparted proximal to but not directly onto a touch sensor panel 408. While the ESD pulse 406 may be directed towards circuitry that is not part of the sensing circuitry described in FIG. 3, the electrical layout of device 400 may provide coupling pathways onto the sensing circuitry that can be modeled by the circuit diagram illustrated in FIG. 3.

As illustrated above, an ESD event can have an effect on the integrity of the touch data being processed by the touch input device in that it can cause a false touch to be registered or cause a touch event to be missed. However, if the touch input device were to determine that an ESD event occurred during a particular period of time, then the touch input device could either ignore data taken during the ESD event, or could compensate touch data that was collected during a detected ESD event. In other words, a touch device could render a touch image based not only on data received by touch sensors, but also using data received from one or more ESD sensors located on the device.

Figure 5:
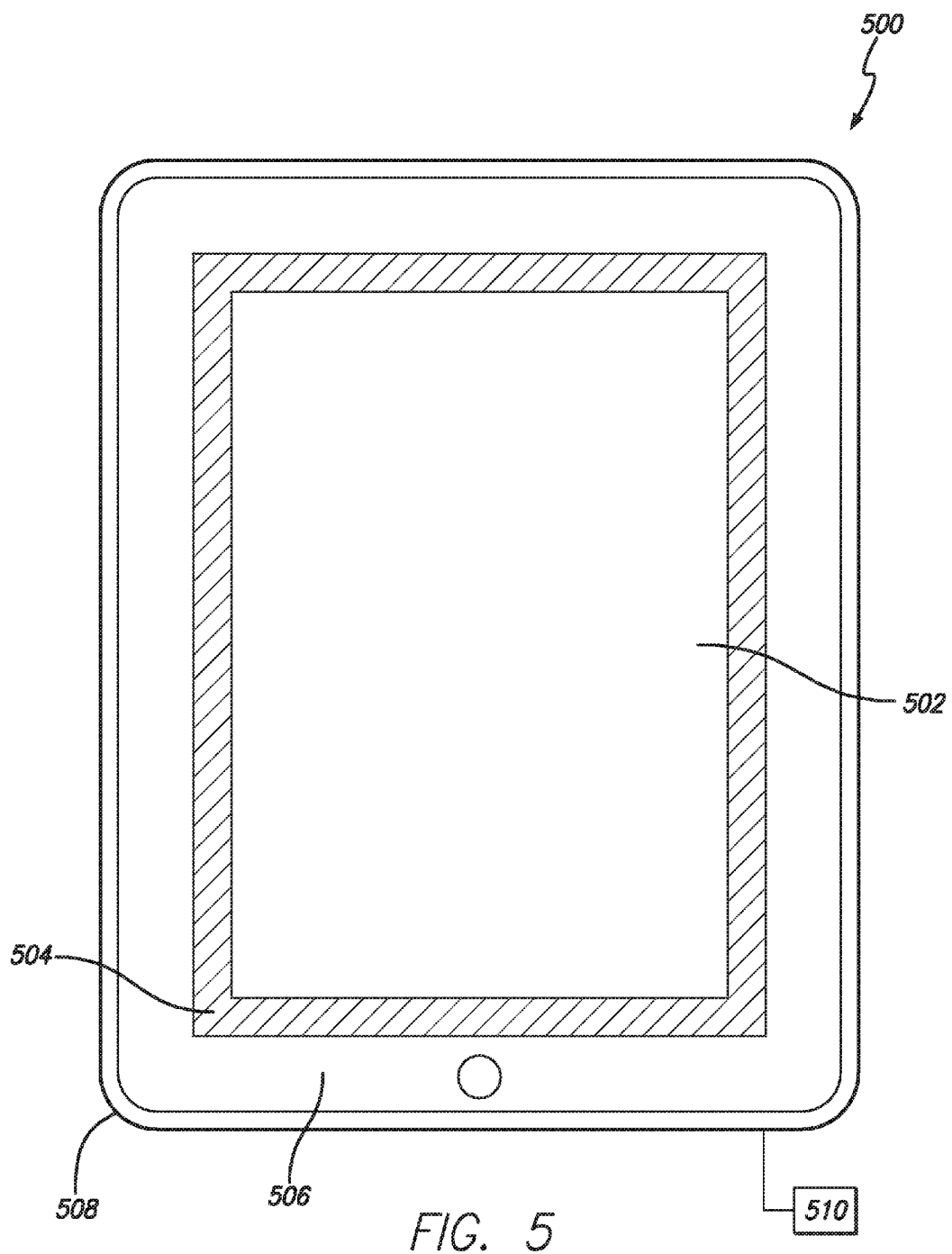
FIG. 5 illustrates an exemplary device incorporating a touch sensor panel and an ESD sensor according to disclosed examples.

FIG. 5 illustrates an exemplary device incorporating a touch sensor panel and an ESD sensor according to disclosed examples. Touch device 500 can include an active area 502, a border region 504, a peripheral area 506, an ESD sensor 508 and a touch microcontroller 510 (touch controller). Note that touch microcontroller 510 is symbolically located outside the touch device in FIG. 5 for purposes of clarity only. Active area 502 can comprise the area of a touch sensitive device 500 in which touch or proximity user input events can be inputted into the device. In some examples, the active region 502 can contain the drive and sense lines that form a mutual capacitive touch input device as described above. The active region 502 can be within the area of touch input device in which a display of the device is visible to the user. Border area 504 can surround active region 502 and can contain conductive traces routed from the active region that are then routed to a touch microcontroller 510. The border area 504 may not be visible to the user when viewing a display of the touch input device 500. In one example, the border area 504 can contain conductive traces that transmit drive signals from touch microcontroller 510, to the drive lines in the active region 502 and can also contain conductive traces that transmit signals from the sense lines in the active region to the touch controller 510. Peripheral area 506 can surround border area 504 and can contain various electronic components utilized by touch input device 500.

ESD sensor 508 can surround peripheral area 504. ESD sensor 508 can be formed in some examples as illustrated by a single conductive trace that surrounds peripheral area 506, border area 504 and active region 502. In other examples not illustrated, ESD sensor 508 can be placed in between peripheral area 506 and border area 504. In other examples, ESD sensor 508 can be placed around the active region 502, between the active region and the border area 504. Since the ESD sensor may not be visible to the user in some examples, it can be formed by various conductors, both opaque and translucent. ESD sensor 508 can be connected to touch controller 510.

During an ESD event occurring on the device 500, a portion of the power from the ESD event can be coupled into the conductive trace of ESD sensor 508. ESD sensor 508 then can route the ESD signal to touch controller 510 for further processing. Thus, touch controller 510 can scan for signals appearing on ESD sensor 508, and use the information to perform various functions on the touch input device.

In one example, touch controller 510 can simultaneously scan the touch nodes contained in active region 502 as well as scan ESD sensor 508. In the event that signals are received on both the touch nodes and the ESD sensor 508, the touch controller 510 can indicate that a possible touch event occurred during an ESD event and can compensate the touch data in light of the detection of an ESD event. In other examples, when an ESD signal appears on sensor 508, the touch controller 510 can perform various health checks of electrical components (including the touch controller itself) that are vulnerable to damage from an ESD event.

Figure 6:
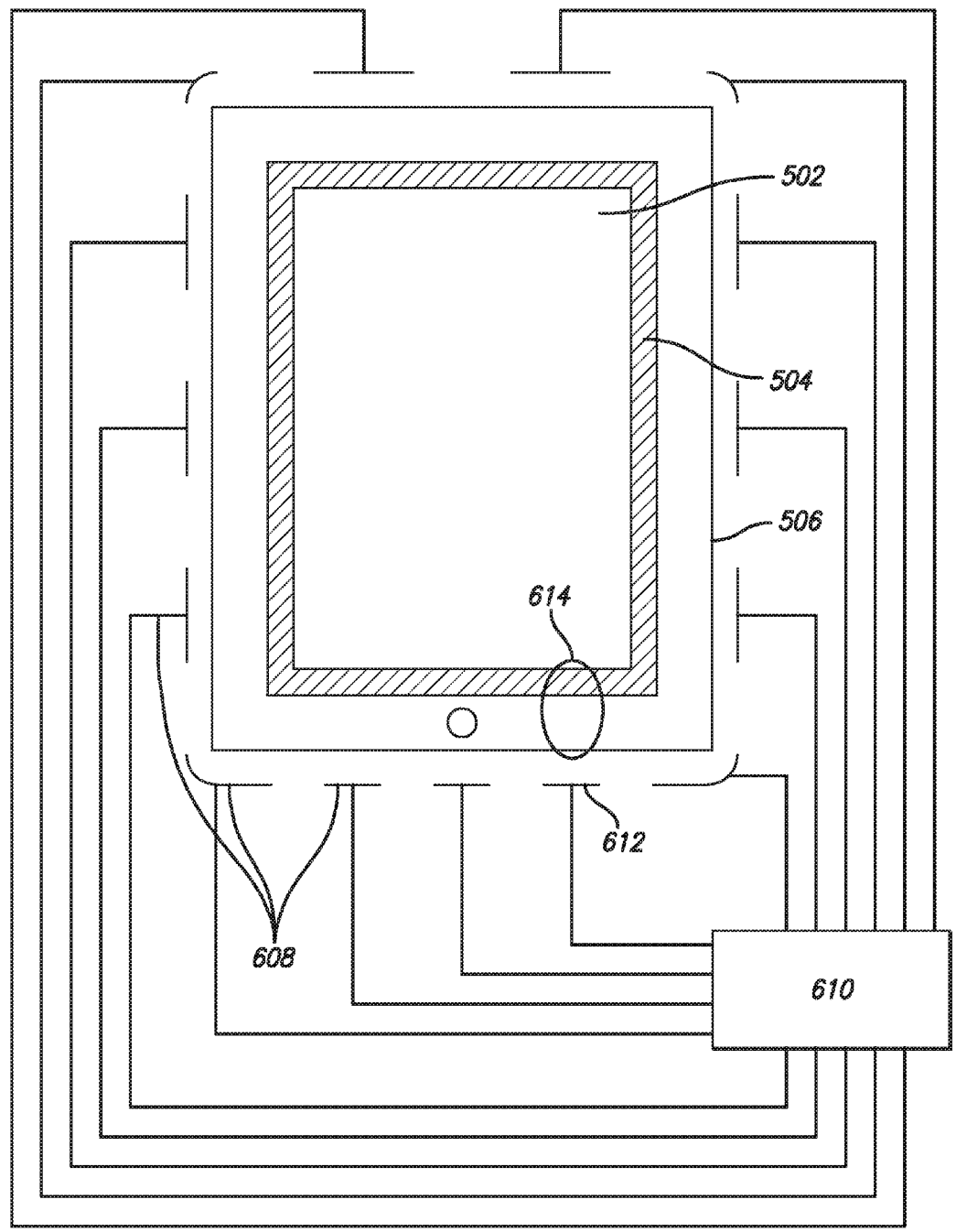
FIG. 6 illustrates another exemplary device incorporating a touch sensor panel and ESD sensors according to disclosed examples.

FIG. 6 illustrates another exemplary device incorporating a touch sensor panel and an ESD sensor according to disclosed examples. In this example, the active region 502, border area 504, and peripheral area 506 are surrounded by a plurality of ESD sensors 608. Each ESD sensor of the plurality of ESD sensors 608 can be electrically isolated from one another, and each sensor can be individually connected to touch controller 610, which can contain a dedicated input pin for each individual sensor of the plurality of ESD sensors, or can multiplex a number of ESD sensors through a fewer number of pins. In a touch device according to the example of FIG. 6, the plurality of ESD sensors 608 can not only signal to the touch controller 610 that an ESD event has occurred on the touch sensitive device, but can also signal the approximate location of the ESD event on the device.

For example, if an ESD event were to occur at location 614 on the touch sensitive device, a portion of the energy coupled into the touch device from the ESD event can be coupled into ESD sensor 612, which is an individual ESD sensor of the plurality of ESD sensors 608. While energy from the ESD event may couple into other ESD sensors proximal to location 614, ESD sensor 612, being the ESD sensor closest to location 614, will likely couple the most power from the ESD event in relation to the other ESD sensors of the plurality of ESD sensors 608. Touch controller 610 can scan the plurality of ESD sensors 608 and compare the magnitudes of the signals present on each individual sensor. By determining which ESD sensor or group of ESD sensors possess the largest ESD signals, the touch controller 610 can determine approximately where on the touch device an ESD event may have occurred. In the example illustrated in FIG. 6, an ESD event at location 614 on the touch device can cause ESD sensor 612 to couple a signal with the highest magnitude in relation to the other ESD sensors in the plurality of ESD sensors 608.

Knowing when and where an ESD event occurred on a touch device can allow touch controller 610 to execute various functions when an ESD event has occurred. Touch controller 610 can simultaneously scan the touch nodes in active region 502 and the plurality of ESD sensors 608. In contrast to the example illustrated in FIG. 5 which alerted the touch controller 510 to the occurrence of an ESD event but could not differentiate location of event, touch controller 610 can determine an approximate location of an ESD event based on the magnitude of signals received at each individual ESD sensor. The touch controller 610 can then choose to either ignore touch signals located proximally to the determined location of the ESD event, or can compensate the received touch signals located proximally to the determined location of the ESD event for effects caused by an ESD event.

In other examples, touch controller 610, upon learning of the approximate location of an ESD event, can perform system health checks of electrical components located proximally to the detected ESD event. If any components are found to be in a state of failure or error due to the ESD event, touch controller 610 can shut down the damaged or malfunctioning component and alert the user to the failure.

While FIG. 6 illustrates the plurality of ESD sensors 608 as being located outside of peripheral area 506, the disclosure is not so limited and can include multiple placements of the ESD sensors, including but not limited to between peripheral 506 and border area 504, and between border area 504 and active region 502.

Figure 7:
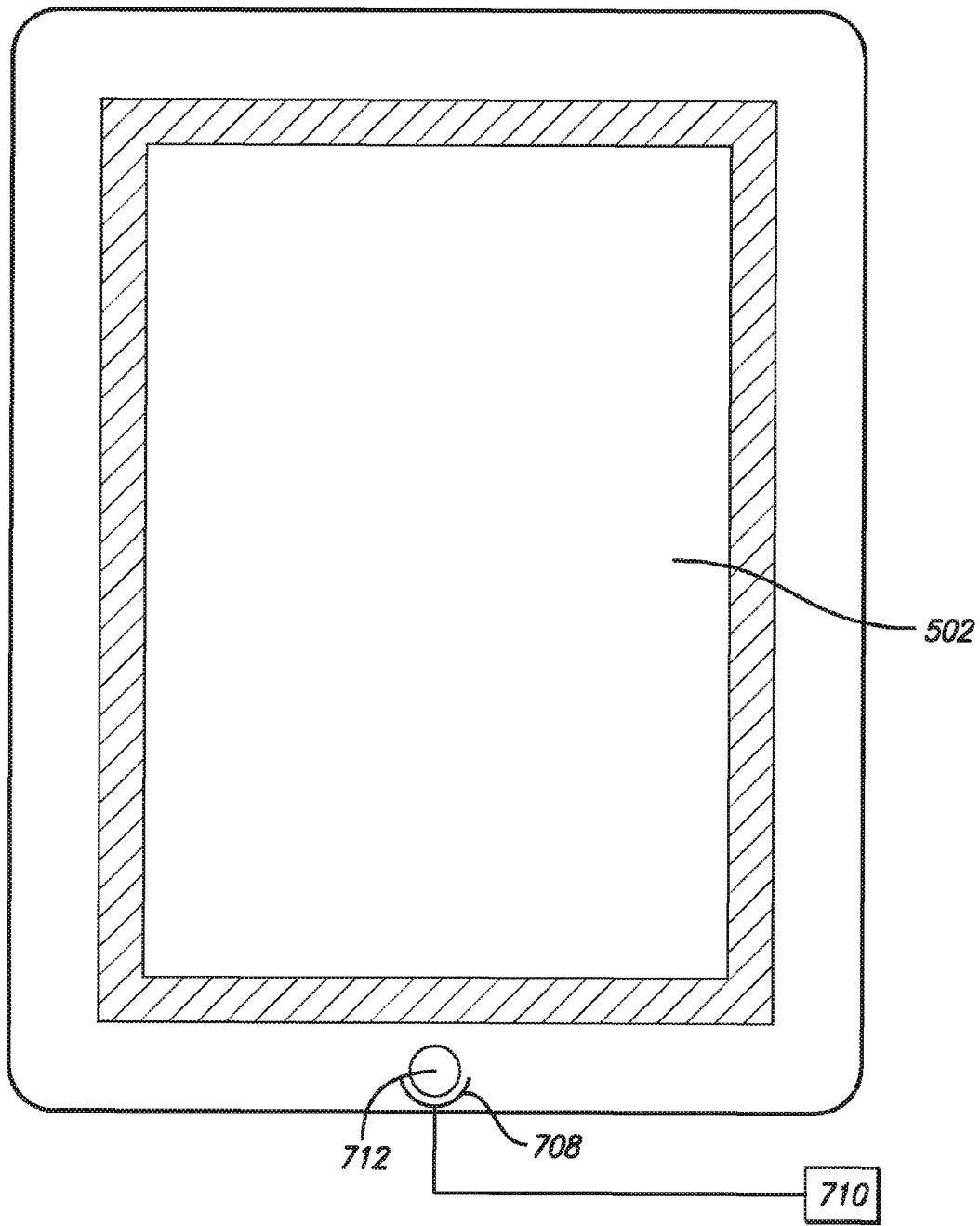
FIG. 7 illustrates yet another exemplary device incorporating a touch sensor panel and an ESD sensor according to disclosed examples.

FIG. 7 illustrates yet another exemplary device incorporating a touch sensor panel and an ESD sensor according to disclosed examples. In some touch devices, particular electrical components of the touch device other than the active touch region 502 may be vulnerable to ESD events. In this example, an ESD sensor 708 is configured so as to partially surround a button 712 (mechanical, virtual, etc.) of the device. If button 712 of the touch device was empirically found to be especially vulnerable to damage from an ESD event, then sensor 708 can indicate to touch controller 710 that a possible ESD event near the vulnerable component has occurred. Touch controller 710 can then perform a health check of the component. While an ESD sensor protecting a button is illustrated, the disclosure is not so limited, and dedicated ESD sensors can be placed around other components such as universal serial bus (USB) ports, cameras, microphones, or other electrical inputs of the device.

In other examples, a dedicated ESD sensor such as the one illustrated in FIG. 7 can be placed around portions of the touch sensitive device that have been empirically found to couple ESD power into the touch detection circuitry discussed above. For example, while ESD events on touch device generally may not cause substantial interference with touch detection, if it were empirically found that ESD events that occur at button 712 can interfere with operation of the touch circuitry, a dedicated ESD sensor 708 can be placed around the button. Thus if an ESD event were to occur at the button, ESD sensor 708 could transmit a signal to touch controller 710 to indicate that an ESD event at the vulnerable location has occurred. Touch controller could simultaneously detect touch events and ESD events, and compensate a touch image if it is determined that an ESD event at or proximal to push button 712 has occurred.

Figure 8:
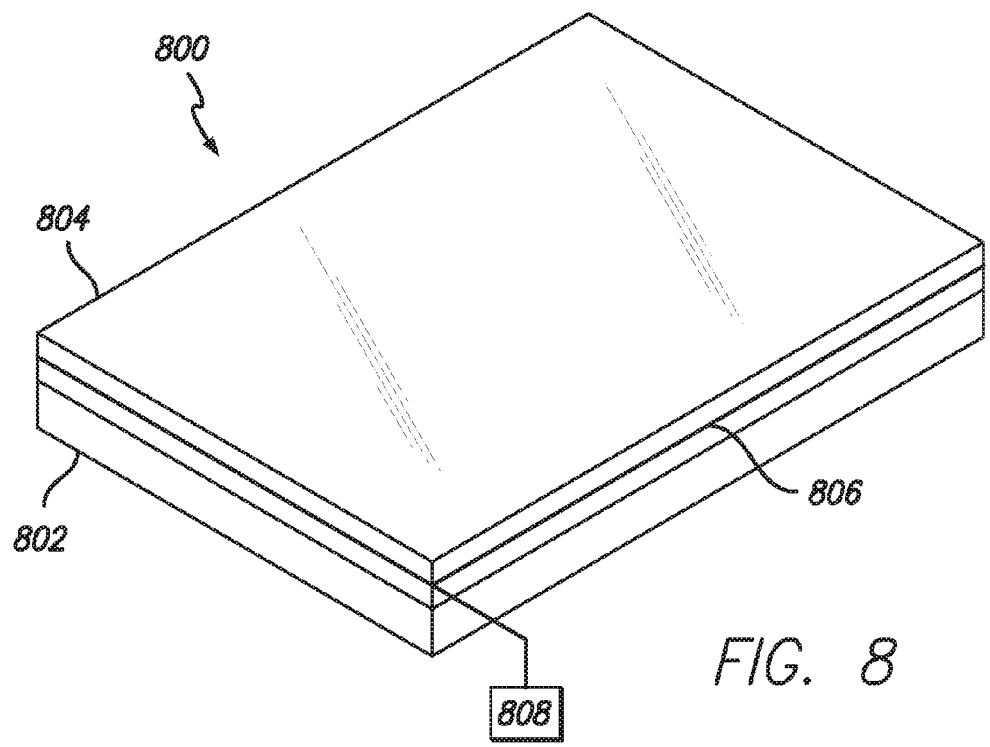
FIG. 8 illustrates an exemplary device incorporating a touch sensor panel and an ESD sensor integrated into the same layer according to disclosed examples.

FIG. 8 illustrates an exemplary device incorporating a touch sensor panel and an ESD sensor integrated into the same layer according to disclosed examples. Touch device 800 can contain two layers visible to the user, display layer 802 and touch sensor layer 804. Touch sensor layer 804 can contain the drive lines and sense lines associated with a mutual capacitance touch detection configuration discussed above. The touch sensor layer can be disposed above a display layer 802 that contains, for example, the liquid crystals used to render images on a liquid crystal display. ESD sensor 806 can be integrated into the touch sensor layer 804 as illustrated, so as to minimize the thickness of the overall device.

Figure 9:
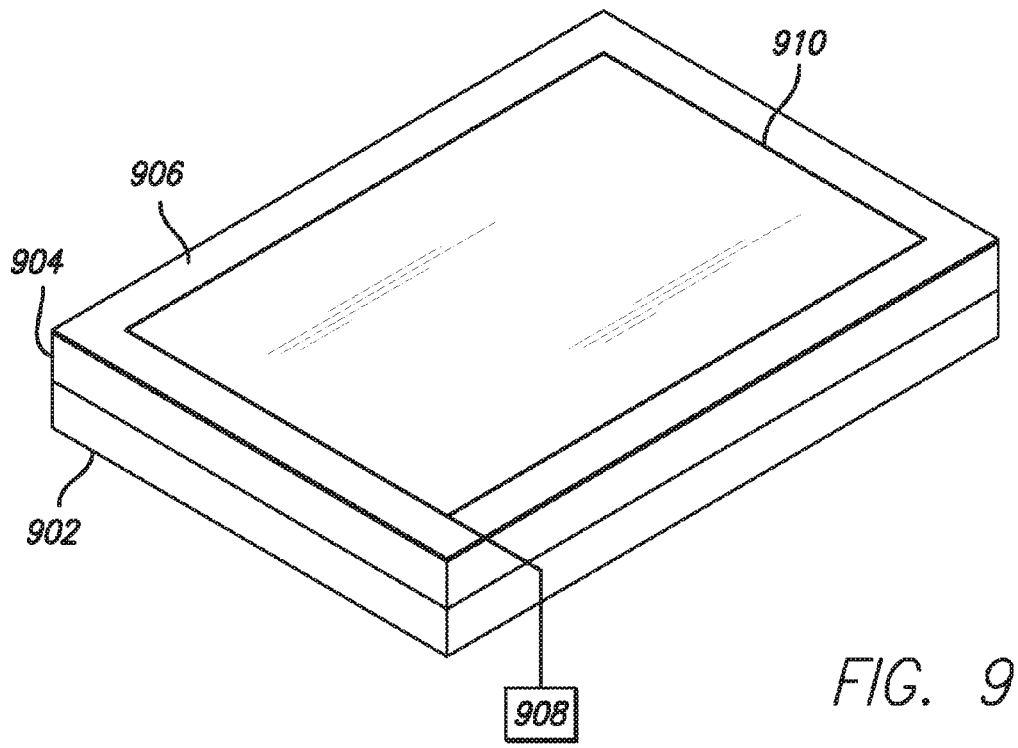
FIG. 9 illustrates an exemplary device incorporating a touch sensor panel and an ESD sensor integrated into different layers according to disclosed examples.

FIG. 9 illustrates an exemplary device incorporating a touch sensor panel and an ESD sensor integrated into different layers according to disclosed examples. Similar to the discussion of FIG. 8, touch layer 904 can be disposed on top of display layer 902. In this example, ESD sensor 910 can be disposed in its own separate layer 906 which can be disposed above touch layer 904 and can be connected to a touch controller 908.

In order to minimize the thickness of ESD layer 906, ESD sensor 910 can be formed using thin conductive material. For instance, conductive ink can be used instead of a metal trace. Conductive ink could still transmit any received ESD signals while at the same time minimizing the added thickness associated with an addition of another layer to the device.

Figure 10:
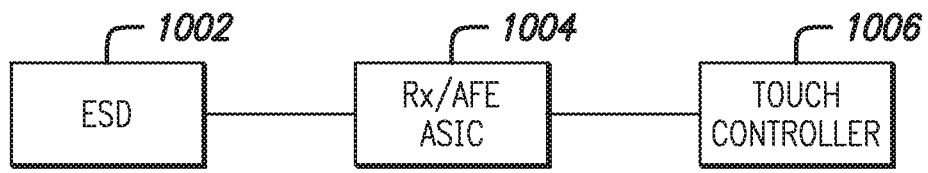
FIG. 10 illustrates an exemplary interface between an ESD sensor and a touch controller according to disclosed examples.

While placement of the ESD sensor or sensors can be important to ensuring adequate protection of the touch sensitive device against ESD events, the method by which a touch controller extracts information from the ESD sensor can also be important to ensuring adequate protection. FIG. 10 illustrates an exemplary interface between an ESD sensor and a touch controller according to disclosed examples. ESD sensor 1002 can be connected to a receive analog front end (Rx AFE) ASIC 1004. Rx AFE 1004 can work to either amplify or reduce the magnitude of the received signal from ESD 1002, can provide signal buffering to the received signals, and can provide other analog signal processing functions. The Rx AFE 1004 can then transmit the signal to touch controller 1006 for further processing. In some examples, Rx AFE 1004 can be integrated on the same chip as touch controller 1006. Touch controller 1006 can scan an array of touch nodes while simultaneously reading the input to the controller coming from Rx AFE ASIC 1004. If the touch controller detects a possible ESD event, the touch controller can then act to compensate the received touch signal for effects caused by the ESD event, or can ignore the touch signals received altogether.

Figure 11:
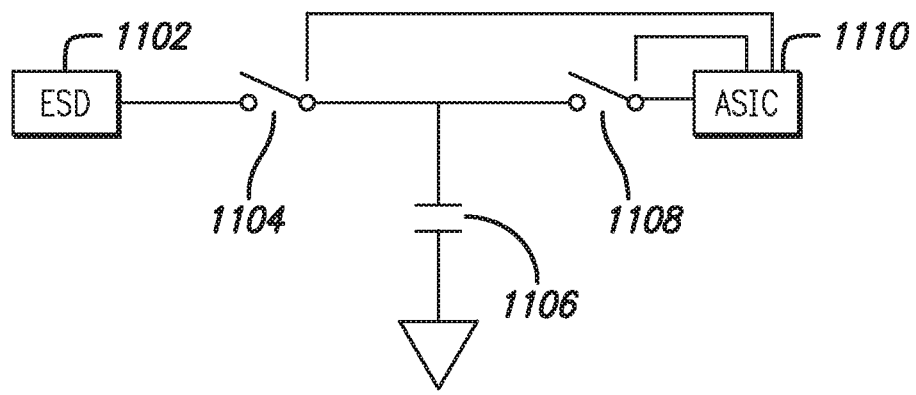
FIG. 11 illustrates another exemplary interface between an ESD sensor and a touch controller according to disclosed examples.

FIG. 11 illustrates another exemplary interface between an ESD sensor and a touch controller according to disclosed examples. In this example, ESD sensor 1102 can be connected to switch 1104 that can connect the ESD sensor to a reservoir capacitor 1106. Reservoir capacitor 1106 can be connected to a second switch 1108 that can connect the reservoir capacitor to touch controller 1110. Switch 1104 and switch 1108 can be configured such that only one switch is closed at any given time while the other switch is left in the open position. This configuration can allow touch controller 1110 to be protected from possible high power signals coming from ESD sensor 1102, which could damage the chip. During ESD event detection, switch 1104 is closed while switch 1108 is open. When an ESD event is transmitted by ESD sensor 1102, it can be sent to reservoir capacitor 1106. Reservoir capacitor 1106, in response to the signal from ESD sensor 1102, can change the amount of charge being stored by the capacitor, by storing all or a portion of the charge emanating from ESD sensor 1102.

When touch controller 1110 performs a scan of ESD sensor 1102, it can first open switch 1104 and close switch 1108. In this configuration the touch controller 1110 is now connected to reservoir capacitor 1106. Touch controller 1110 can then determine the amount of charge stored in reservoir capacitor 1106. Touch controller 1110 can then compare the measured charge to a pre-determined value to determine if the charge of the reservoir capacitor 1106 has changed in response to activity on the ESD sensor. In other examples, touch controller 1110 can compare the measured reservoir capacitor charge to a previously measured reservoir charge to see if there are any substantial changes to the charge that could be indicative of an ESD event appearing on ESD sensor 1102.

Figure 12:
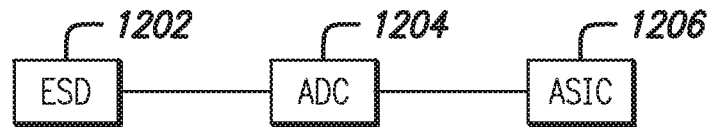
FIG. 12 illustrates another exemplary interface between an ESD sensor and a touch controller according to disclosed examples.

FIG. 12 illustrates another exemplary interface between an ESD sensor and a touch controller according to disclosed examples. In this example, ESD sensor 1202 can interface with analog to digital converter (ADC) 1204, which is connected to or a part of touch controller 1206. Signals appearing on ESD sensor 1202 can be converted to digital words by ADC 1204 and then be read by touch controller 1206 to determine if an ESD event has occurred. In some examples, the digital words produced by ADC 1204 can be compared to a pre-determined threshold, and if the value is exceeded, the touch controller 1206 can determine that an ESD even has occurred.

Figure 13:
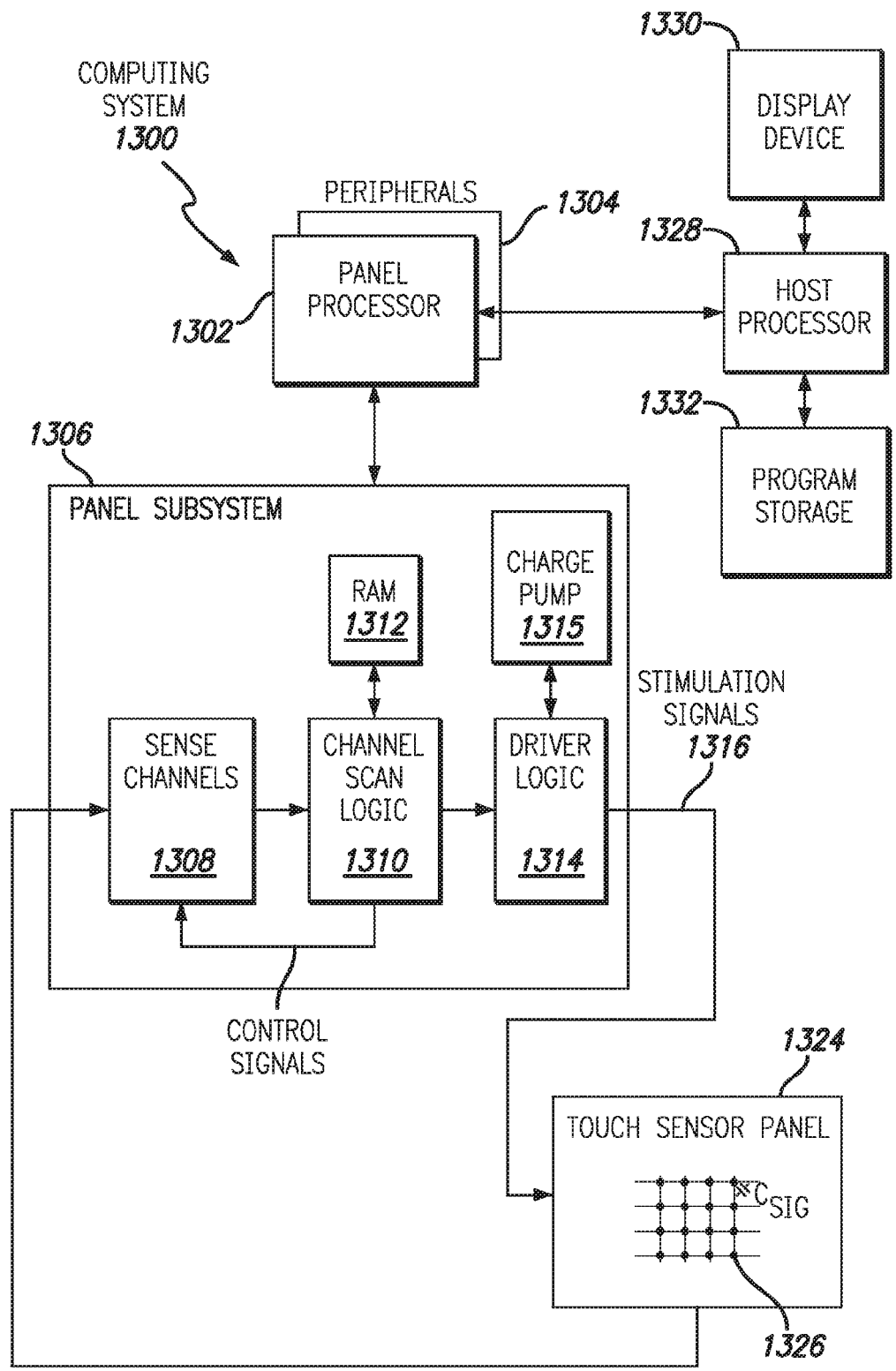
FIG. 13 illustrates exemplary computing system that can include one or more of the examples described above.

FIG. 13 illustrates exemplary computing system 1300 that can include one or more of the examples described above. Computing system 1300 can include one or more panel processors 1302 and peripherals 1304, and panel subsystem 1306. Peripherals 1304 can include, but are not limited to, random access memory (RAM) or other types of memory or storage, watchdog timers and the like. Panel subsystem 1306 can include, but is not limited to, one or more sense channels 1208 which can utilize operational amplifiers that can be configured to minimize saturation time, channel scan logic 1310 and driver logic 1314. Channel scan logic 1310 can access RAM 1312, autonomously read data from the sense channels and provide control for the sense channels including calibrating the sense channels for changes in phase correlated with a parasitic capacitance. In addition, channel scan logic 1310 can control driver logic 1314 to generate stimulation signals 1316 at various frequencies and phases that can be selectively applied to drive lines of touch sensor panel 1324. In some examples, panel subsystem 1306, panel processor 1302 and peripherals 1304 can be integrated into a single application specific integrated circuit (ASIC).

Touch sensor panel 1324 can include a capacitive sensing medium having a plurality of drive lines and a plurality of sense lines, although other sensing media can also be used. Each intersection of drive and sense lines can represent a capacitive sensing node and can be viewed as picture element (node) 1326, which can be particularly useful when touch sensor panel 1324 is viewed as capturing an "image" of touch. Each sense line of touch sensor panel 1324 can drive sense channel 1308 (also referred to herein as an event detection and demodulation circuit) in panel subsystem 1306. The drive and sense lines can also be configured to act as individual electrodes in a self-capacitance touch sensing configuration.

Computing system 1300 can also include host processor 1328 for receiving outputs from panel processor 1302 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1328 can also perform additional functions that may not be related to panel processing, and can be coupled to program storage 1332 and display device 1304 such as an LCD display for providing a UI to a user of the device. Display device 404 together with touch sensor panel 1324, when located partially or entirely under the touch sensor panel, can form touch screen 1318.

Note that one or more of the functions described above can be performed by firmware stored in memory (e.g. one of the peripherals 1304 in FIG. 13) and executed by panel processor 1302, or stored in program storage 1332 and executed by host processor 1328. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 14A:
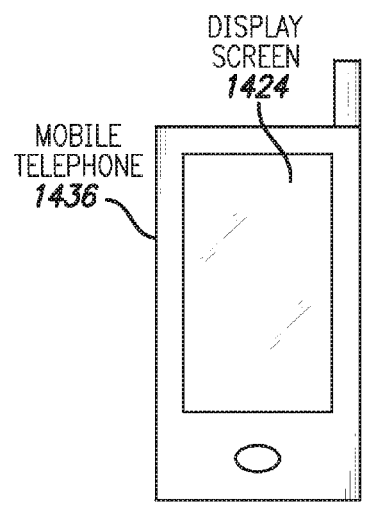
FIGS. 14a-14d illustrate various electronic devices that can include one or more of the examples described above.

FIG. 14*a* illustrates exemplary mobile telephone 1436 that can include touch sensor panel 1424 and display device 1430, the touch sensor panel including circuitry to detect the presence of an ESD event according to one disclosed example.

Figure 14B:
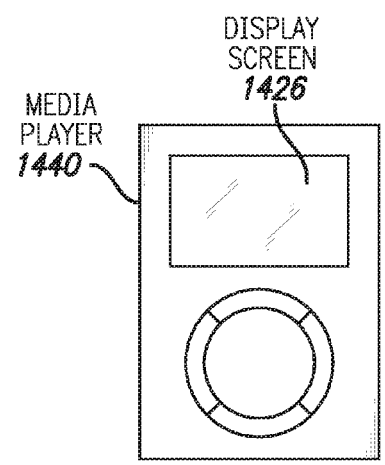

FIG. 14*b* illustrates exemplary digital media player 1440 that can include touch sensor panel 1424 and display device 1430, the touch sensor panel including circuitry to detect the presence of an ESD event according to one disclosed example.

Figure 14C:
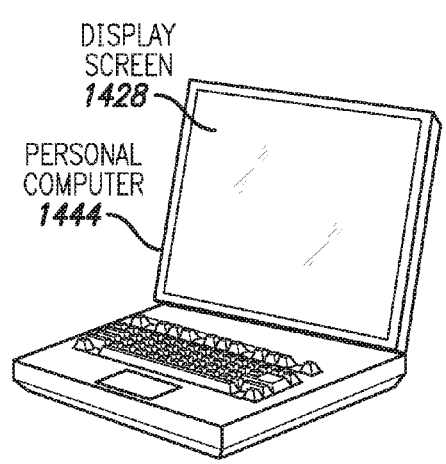

FIG. 14*c* illustrates exemplary personal computer 1444 that can include touch sensor panel (trackpad) 1424 and display 1430, the touch sensor panel and/or display of the personal computer (in examples where the display is part of a touch screen) including circuitry to detect an ESD event according to one disclosed example.

Figure 14D:
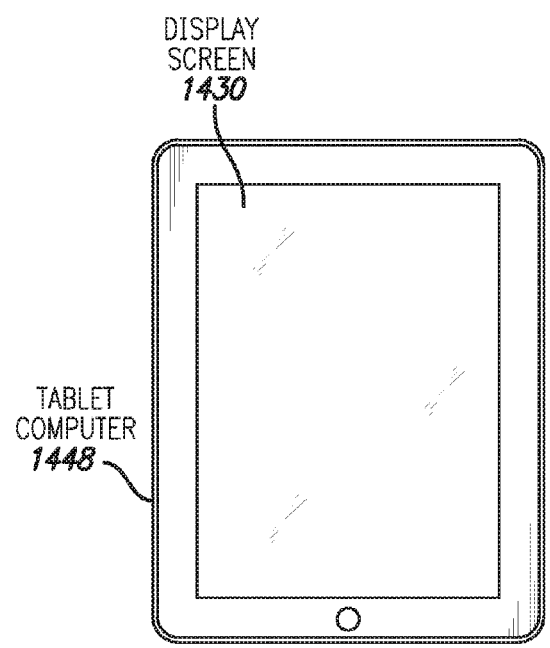

FIG. 14*d* illustrates exemplary tablet computer 1448 that can include touch sensor panel 1424 and display screen 1430, the touch sensor panel and/or display of the tablet computer (in examples where the display is part of a touch screen) including circuitry to detect an ESD event according to one disclosed example. The mobile telephone, media player and personal computer of FIGS. 14*a*-*d* can reduce the adverse effects on the detection of touch caused by an ESD event.

Although FIGS. 14*a*-*d* discuss a mobile telephone, a media player, a personal computer and a tablet computer respectively, the disclosure is not so restricted and the touch sensor panel can be included on a television or any other device which can benefit from the reduction of adverse effects on the detection of touch caused by an ESD event.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A touch sensitive device capable of detecting the occurrence of an ESD event, the device comprising:
   a touch sensor panel having a plurality of touch sensors configured to detect one or more touch or proximity events occurring on the touch sensitive device;
   an ESD sensor configured to detect an ESD event on the touch sensitive device independently of the plurality of touch sensors, the ESD sensor at least partially surrounding a peripheral of the plurality of touch sensors, and a processor capable of:
acquiring a touch image from the touch sensor panel;
acquiring ESD information from the ESD sensor; and
compensating the touch image based on the acquired ESD information.

2. The touch sensitive device of claim 1, wherein the plurality of touch sensors and the ESD sensor are integrated onto a same layer.

3. The touch sensitive device of claim 1, wherein the plurality of touch sensors and the ESD sensor are disposed on separate layers.

4. The touch sensitive device of claim 3, further including a display layer disposed in a first layer, and wherein the plurality of touch sensors are disposed in a second layer and the ESD sensor is disposed in a third layer, the first layer positioned on one side of the second layer and the third layer positioned on the other side of the second layer.

5. The touch sensitive device of claim 1, wherein the ESD sensor substantially surrounds the plurality of touch sensors.

6. The touch sensitive device of claim 5, wherein the plurality of touch sensors and the ESD sensor are integrated onto the same layer.

7. The touch sensitive device of claim 5, wherein the plurality of touch sensors and the ESD sensor are disposed on separate layers.

8. The touch sensitive device of claim 7, further including a display layer disposed in a first layer, and wherein the plurality of touch sensors are disposed in a second layer and the ESD sensor is disposed in a third layer, the first layer positioned on one side of the second layer and the third layer positioned on the other side of the second layer.

9. The touch sensitive device of claim 1, further comprising a capacitor coupled between an output of the ESD sensor and the processor for protecting the processor.

10. The touch sensitive device of claim 1, further comprising an ASIC coupled between an output of the ESD sensor and the processor for modifying a magnitude of a signal output from the ESD sensor.

11. The touch sensitive device of claim 1, wherein the ESD sensor is located proximally to one or more components of the touch sensitive device that couples ESD power to touch detection circuitry wherein the compensating of the touch image is performed when the processor simultaneously detects the one or more touch or proximity events and the ESD event.

12. The touch sensitive device of claim 11, wherein the one or more components of the touch sensitive device include a button configured to receive user input.

13. A method of compensating touch images for the effects of an ESD event on a touch sensitive device, the method comprising:
acquiring a touch image from a touch sensor panel having a plurality of touch sensors configured to detect touch or proximity events on a touch sensitive device;
acquiring ESD information from an ESD sensor operating independently of the plurality of touch sensors, the EDS sensor located on the touch sensitive device and at least partially surrounding a peripheral area of the plurality of touch sensors; and
compensating the touch image based on the ESD information acquired from the ESD sensor.

14. The method of claim 13, wherein the ESD sensor is located proximally to one or more components of the touch sensitive device that couples ESD power to touch detection circuitry wherein the compensating of the touch image is performed upon the simultaneous occurrence of the touch or proximity events and the ESD information.

15. The method of claim 14, wherein the one or more components of the touch sensitive device include a button configured to receive user input and wherein acquiring ESD information from the ESD sensor further comprises determining the presence of an ESD event located proximally to the button.

16. A non-transitory computer readable storage medium having stored thereon a set of instructions for compensating touch images for ESD events on a touch sensor panel, that when executed by a processor causes the processor to:
acquire a touch image from a touch sensor panel having a plurality of touch sensors configured to detect touch or proximity events on a touch sensitive device;
acquire ESD information from an ESD sensor operating sensor operating independently of the plurality of touch sensors, the EDS sensor located on the touch sensitive device and at least partially surrounding a peripheral area of the plurality of touch sensors; and
compensate the touch image based on the ESD information acquired from the ESD sensor.

17. The non-transitory computer readable storage medium of claim 16, wherein the ESD sensor is located proximally to one or more components of the touch sensitive device that couples ESD power to touch detection circuitry wherein the compensating of the touch image is performed upon the simultaneous occurrence of the touch or proximity events and the ESD information.

18. The non-transitory computer readable storage medium of claim 17, wherein the one or more components of the touch sensitive device include a button configured to receive user input and wherein acquiring ESD information from the ESD sensor further comprises determining the presence of an ESD event located proximally to the button.

19. A touch sensitive device capable of detecting the occurrence of an ESD event, the device comprising:
a touch sensor panel configured to detect one or more touch or proximity events occurring on the touch sensitive device;
a plurality of ESD sensors, each configured to detect an ESD event on the touch sensitive device, the plurality of ESD sensors at least partially surrounding a peripheral area of the touch sensor panel; and
a processor capable of:
acquiring a touch image from the touch sensor panel;
acquiring ESD information from the plurality of ESD sensors; and
compensating the touch image based on the acquired ESD information;
wherein the plurality of ESD sensors are disposed in a plurality of locations throughout the touch sensitive device and wherein the processor is further capable of determining an approximate location of an ESD event occurring on the device, based on the ESD information.

20. The touch sensitive device of claim 19, wherein the plurality of ESD sensors are located proximally to one or more components of the touch sensitive device that couples ESD power to touch detection circuitry wherein the compensating of the touch image is performed upon the simultaneous occurrence of the touch or proximity events and the ESD information.

21. The touch sensitive device of claim 20, wherein the one or more components of the touch sensitive device include a button configured to receive user input.

22. A method of compensating touch images for the effects of an ESD event on a touch sensitive device, the method comprising:
acquiring a touch image from a touch sensor panel having a plurality of touch sensors configured to detect touch or proximity events on a touch sensitive device;
acquiring ESD information from an ESD sensor, located on the touch sensitive device, the ESD sensor substantially surrounding the plurality of touch sensors; and
compensating the touch image based on the ESD information acquired from the one or more ESD sensors.

23. The method of claim 22, wherein the ESD sensor is located proximally to one or more components of the touch sensitive device that couples ESD power to touch detection circuitry wherein the compensating of the touch image is performed upon the simultaneous occurrence of the touch or proximity events and the ESD information.

24. The method of claim 23, wherein the one or more components of the touch sensitive device include a button configured to receive user input and wherein acquiring ESD information from the ESD sensor further comprises determining the presence of an ESD event located proximally to the button.

25. A non-transitory computer readable storage medium having stored thereon a set of instructions for compensating touch images for ESD events on a touch sensor panel, that when executed by a processor causes the processor to:
acquire a touch image from a touch sensor panel having a plurality of touch sensors configured to detect touch or proximity events on a touch sensitive device;
acquire ESD information from an ESD sensor located on the touch sensitive device, the ESD sensor at least partially surrounding a peripheral area of the plurality of touch sensors; and
compensating the touch image based on the ESD information acquired from the ESD sensor.

26. The non-transitory computer readable storage medium of claim 25, wherein the ESD sensor is located proximally to one or more components of the touch sensitive device that couples ESD power to touch detection circuitry wherein the compensating of the touch image is performed upon the simultaneous occurrence of the touch or proximity events and the ESD information.

27. The non-transitory computer readable storage medium of claim 26, wherein the one or more components of the touch sensitive device include a button configured to receive user input and wherein acquiring ESD information from the ESD sensor further comprises determining the presence of an ESD event located proximally to the button.

* * * * *